March 28, 1939. O. J. LEINS Re. 21,038

MAGNETIC SWITCH

Original Filed July 28, 1932 2 Sheets-Sheet 1

Inventor:
Oscar J. Leins
By Brown, Jackson, Boettcher & Dienner
Attys.

March 28, 1939. O. J. LEINS Re. 21,038

MAGNETIC SWITCH

Original Filed July 28, 1932 2 Sheets-Sheet 2

Inventor:
Oscar J. Leins
By Brown, Jackson, Boettcher & Dienner
Attys.

Reissued Mar. 28, 1939

Re. 21,038

UNITED STATES PATENT OFFICE 21,038

MAGNETIC SWITCH

Oscar J. Leins, Milwaukee, Wis., assignor to Milwaukee Gas Specialty Company, Milwaukee, Wis., a corporation of Wisconsin Original No. 1,958,482, dated May 15, 1934, Serial No. 625,421, July 28, 1932. Application for reissue January 10, 1939, Serial No. 250,248

24 Claims. (Cl. 200—138)

This invention relates to magnetic switches, and more particularly to magnetic switches having the contacts therein operating in an evacuated tube, or in a tube filled with an inert gas.

In switches operating in air and used in circuits carrying relatively heavy currents, there is arcing and oxidation at the switch points, resulting in increased resistance in the points, and deterioration, shortness of life, and decreased utility. In air conditioning systems and large heating and ventilating plants, the control devices operate fans, spray discharge pumps, stoker motors and other similar devices, which require relatively heavy operating currents, and with these currents the deterioration of a switch with air-exposed contacts is rapid.

In the present invention, I provide a switch in which the switch contacts operate in a vacuum tube, or in a tube filled with an inert gas. The tube, in the preferred form of the invention, is of such form as to be inserted into a suitable socket connected into the circuit between the device controlled by the switch and the source of current therefor. The switch contacts are disposed within the tube, and are normally resiliently spaced apart, one of the contacts being supported on the free end of a leaf spring. It is to be understood, of course, that the switch may be of the normally closed type within the scope of the present invention, in which case the contacts will be opened in the manner hereinafter described in connection with the closing of these contacts.

The movable contact spring is also provided with an armature, which is adapted to be attracted by a magnet coming into proximity thereto for closing the contacts with a snap action, this action being described in detail in the copending application of Harold A. Mantz, Serial No. 548,088, filed July 1, 1931. Also, because of the tension in the spring member when the contact is engaged, the removal of the magnet will cause a snap opening of the contacts at the point at which the spring tension is in excess of the magnetic attraction. This is highly desirable, since the snap action of the contact will materially decrease any arcing which might be present.

In the present invention, the means for causing movement of the magnet for opening and closing the switch is provided by a thermally sensitive bimetallic strip, which carries a permanent magnet, although it is to be understood that any other type of actuating means might be used, such as a humidity-sensitive device, a pressure responsive diaphragm, or the like. The movement of the permanent magnet in response to temperature changes or the like, causes the magnet to assume a position whereby the armature of the contact spring will be attracted for closing the contacts, and thus completing the circuit to the device controlled by the switch. As this controlled device functions to compensate for movement of the magnet, the magnet will tend to return to its normal position, and, when it reaches a position such that the magnetic attraction is less than the tension of the leaf spring supporting the movable contact, the circuit will be opened by the snap action of the movable contact away from the permanent contact.

The invention is of particular use in connection with room thermostats, oven and furnace controls, and temperature limiting controls, and may be employed in a two-wire control system, as shown, or in a system employing more than one control circuit, in which case additional armatures and contacts are provided.

It is an object of the invention to provide a switch for effecting control of an electric circuit which is small, compact and fully enclosed, and which may be easily mounted in a thermostat or other control device.

Another object of the invention is to provide a switch unit which may be easily replaced, and which requires no adjustment of parts or connections when placed in operating position.

Another object of the invention is to provide, in combination with a switch unit, a socket for receiving the unit and securing it in position with respect to a thermally responsive member or similar actuating means.

Another object of the invention is to provide means for causing the switch to open and close the circuit at different points within a given thermometric range, or in response to a predetermined or preselected pressure or humidity condition, in order to provide for variation in the response of the controlled device in accordance with any predetermined condition desired.

Other objects and advantages of the invention will appear more fully from the following detailed description, which, together with the accompanying drawings, will disclose to those skilled in the art the particular construction and operation of a preferred embodiment of the invention.

In the drawings:

Figure 4 is a sectional view of the switch unit, showing the base portion thereof;

Figure 1:
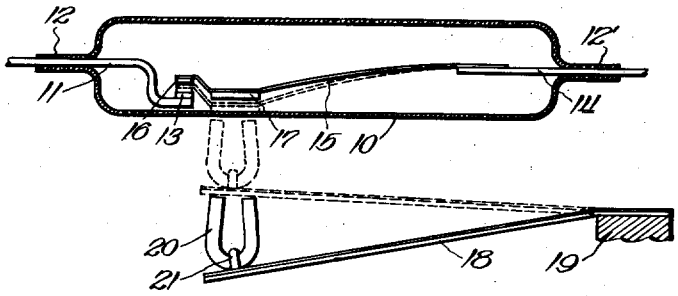
Figure 1 is a diagrammatic view of a switch, showing the principles of operation of my invention.

Referring now in detail to Figure 1, I have disclosed a container or casing for the switch parts, indicated by the reference numeral 10, the container being formed of glass, quartz, or other suitable non-magnetic material. For high temperature conditions, pyrex glass or non-fusible material may be used. The container 10 is provided with a terminal lead 11, which is cemented or otherwise secured and sealed in an extending portion 12 of the casing. The lead 11 is provided with a down-turned portion upon which a contact 13 is mounted, the contact 13 being disposed adjacent the side wall of the casing.

At its opposite end the casing 10 is provided with a second lead 14, suitably secured and sealed in an extending portion 12′ of the casing, and the lead 14 is provided, adjacent its end, with a cantilever leaf spring member 15, which is soldered, riveted, or otherwise suitably secured to the end of the lead 14. At the end of the spring member 15 is a second contact 16, which is adapted to engage the contact 13 for closing the circuit controlled by this switch.

The spring 15 is also provided with an armature 17 secured to a flattened portion thereof, which armature is formed of magnetic material, such as soft iron or the like.

Disposed beneath the casing 10 is a thermally sensitive member 18, which preferably comprises a pair of metal strips suitably secured together, the strips having different coefficients of expansion. At one end of the member 18 a supporting block 19 is positioned, for securely holding this end of member 18 in position. A permanent magnet 20, shown in the form of a horseshoe magnet, is mounted, by means of the staple member 21, to the other end of the thermally sensitive member 18, and extends upwardly toward the casing 10.

Upon variations in temperature, the member 18 is adapted to warp to the position shown in dotted lines in Figure 1, and, as the magnet approaches the casing 10, the attraction of the armature by the magnet is sufficient to force the armature downwardly, into the position shown in dotted lines, to engage the contact 16 with the contact 13. This results in tensioning the spring member 15. The circuit being closed, a suitable control device is actuated for varying the temperature, and upon rectification of the condition which caused the member 18 to warp upwardly, the member will tend to draw away from the casing 10, and, at the point at which the magnetic attraction between the armature 17 and the magnet 20 is not as great as the tension in the spring 15, the contact 16 will snap away from the contact 13, and the circuit will be broken. This cycle of operation may be continued indefinitely.

Having described diagrammatically the manner in which the switch of the present invention operates, I will now describe the same as embodied in a suitable control device. Considering in detail Figures 2, 3, and 4, I have shown the switch in connection with a limit control for limiting the maximum temperature to be attained in a given enclosure. In this embodiment, I have disclosed the device as mounted upon a supporting wall 23, the device being insulated from the wall by means of an insulating washer 24 disposed between an outer flange 25 of the housing or casing 26 and the wall 23. The housing 26 is preferably cylindrical in form, and is provided with an enlarged recessed portion adapted to receive the socket 27 which supports the switch unit, indicated in its entirety by the numeral 28. The housing 26 is secured to the wall 23 by means of a plurality of screws or other securing members passing through the openings 29 formed in the flange 25. The socket 27 is secured to the interior of the housing 26 by means of a plurality of cap screws 30, which extend through a flange 31 of the socket and which are threaded into a suitable shoulder formed in the housing 26. An annular washer 32, which may be of insulating material if desired, is disposed between the socket 27 and the housing 26, and both the socket and housing are formed of Bakelite or other similar insulating material.

The housing 26 is provided with a laterally extending opening 33, which is adapted to receive the armored cable 34 within which the conductors 35 and 36 are disposed. These conductors are secured to a pair of contact studs or terminal bushings 37 extending to the interior of the socket 27, there being a contact spring 38 mounted on the inner end of each of the bushings 37. These contact springs 38 are adapted to be engaged by projecting studs 39 carried upon the base 40 of the switch unit. A cover plate 41 is adapted to be secured to the outer end of the casing 26, and is held in position by means of the screw 42. A set screw 43 is provided for holding the armored cable 34 in position with respect to the housing 26.

Considering now in detail Figure 4, in which I have shown a sectional view of the switch unit, this unit comprises the casing 44, which casing is provided with a base 40 formed of insulating material, and preferably hollow. Cement, or other suitable binder 45 is provided for securing the casing 44 to the base 40, as is well known in the electric light and radio art. A secondary glass support 46 is provided which has the extending legs 47 secured in the cement or other suitable binder 45. Terminal leads 48 extend from the contact studs 39 inwardly to the glass support 46, one of the leads terminating in a down-turned terminal portion 49 having a contact portion 50 formed thereon. The other lead extends forwardly and is provided with a contact spring support 51 terminating at its outer end in an up-turned portion adapted to support the contact spring 52, which corresponds to the spring 15 in Figure 1. The spring 52 is provided with the armature 53, and with the contact portion 54, so that upon attraction of the armature 53 by the magnet, the contact 54 will engage the contact 50 for closing the circuit.

The base 40 is provided with an extending pin member 55, which passes through a suitable keyway formed in the socket 27 for securing the switch unit in the socket with the studs 39 engaging the contact springs 38 of the bushings 37. This is a well known expedient.

Returning now to Figure 2, the socket 27 also supports a heat insulating washer 57, which washer forms a closure for one end of the cylindrical bimetallic support 58 which extends outwardly through an opening 59 formed in the wall 23, and which is provided, at its end, with a depressed portion 60 adapted to receive one end of the thermally sensitive member 61. This member is secured to the depressed portion 60 of the support 58 by means of a rivet 62.

Figure 7:
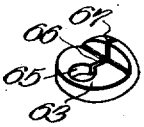
Figure 7 is a prospective view of the magnet carried by the thermally sensitive member and used in connection with the embodiments of Figures 2 and 5.

The thermally sensitive member 61 is in the form of a helix which encircles the outer end of the switch unit 28, and which carries at its opposite end a permanent magnet 63, of the form shown in detail in Figure 7. The magnet 63 is secured to the end of the thermally sensitive member 61 by means of a rivet 64, which extends through an opening 65 formed in the magnet, the magnet being slotted, as indicated at 66 in Figure 7, to provide two arms for forming a substantially horseshoe type of magnet. The magnet is also provided with the upturned ends 67 for allowing the magnet to approach to close proximity to the armature 53 carried by the contact spring 52.

In operation, variations in temperature will cause the helically coiled thermally sensitive member 61 to expand or contract, causing rotary motion of the magnet 63 about the casing 44 of the switch unit 28. This permits the magnet to approach close proximity to the armature 53, and, the magnet attracting the armature will cause it to move downwardly to provide contact between the contact 54 and the contact 50 of the switch unit. This completes a circuit through the studs 39, contacts 38, and conductors 35 and 36 leading to the control device and to the current supply source. Upon operation of the control device, the temperature will be changed, and reverse actuation of the member 61 will take place, causing the magnet 63 to be moved away from the armature 53, thus releasing the armature and opening the circuit because of the tension in the spring member 52.

It is desirable, in the device of this type, to provide means for causing the switch to respond to any desired or predetermined temperature, and for this purpose I have provided the flange 25 of the casing 26 with a temperature scale, indicated generally by the numeral 69, which temperature scale is disposed upon the wall portion of the flange 25, and which, in this embodiment, extends from 100 to 500 degrees. It is obvious, however, that any suitable temperature range might be provided, and the device may function over any desired range of temperature. A pointer 70, which has its inner end secured to the cylindrical support 58 by means of the screw 71, and which extends through a slot 72 formed in the lower projecting portion 73 of the casing, is adapted to be moved to the desired temperature indication. Movement of the pointer 70 causes rotation of the support 58 about the unit 28, thus varying the position of the thermally sensitive member 61 and consequently varying the position of the magnet 67 with respect to the armature 53. It is thus apparent that the variation in response of the unit will be controlled by the movement of the magnet in accordance with the movement of the pointer 70 to the desired or predetermined point. A slot 74 is provided in the support 58, and is engaged by a pin 75 carried by the socket 27, for aligning the support with respect to the socket and the switch unit.

It is thus apparent that I have provided a temperature controlling device, in which the circuit for actuating the control is opened or closed by magnetic attraction due to movement of a thermally sensitive member. This opening or closing of the circuit by the switch is provided at any predetermined point within a given thermometric range and the desired point can be determined by means of the pointer 70 and scale 69. The switch unit 28 is compact, small, and requires no adjustment of parts after once having been constructed. It is easily insertable within the socket 27, and the studs 39 carried thereby engage the contact springs 38 for insuring an efficient and shock proof electrical connection. It is obvious that upon deterioration or breakage of the unit 28, it may be readily removed, and another unit of the same type readily inserted within the socket.

Figure 5:
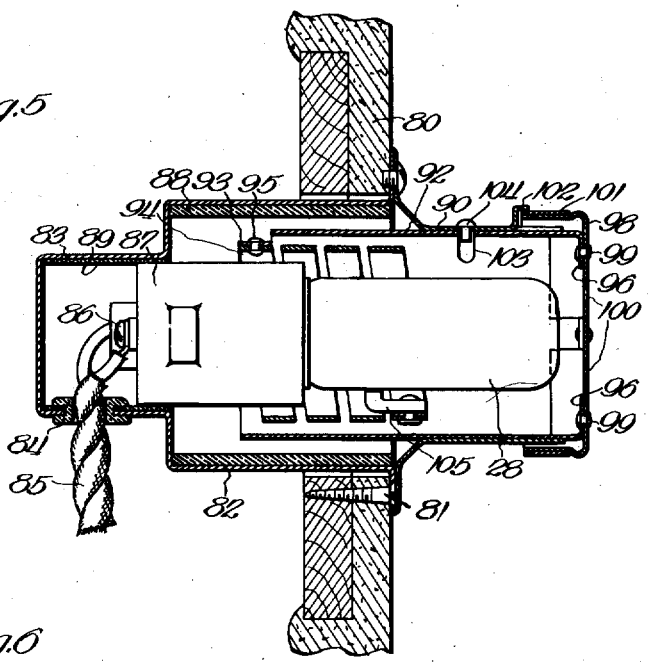
Figure 5 is a sectional view showing the switch unit mounted in a room thermostat or similar appliance.
Figure 6:
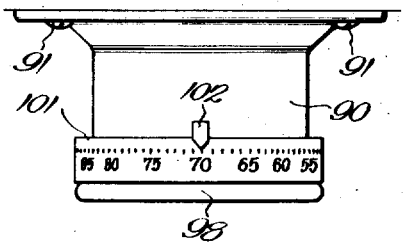
Figure 6 is a plan view of the selecting mechanism for use in the thermostat shown in Figure 5.
Figure 11:
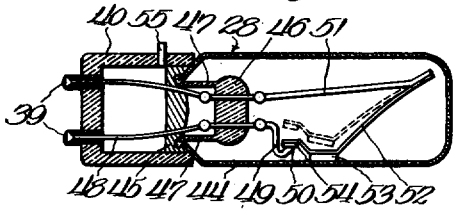

Referring now to the embodiment disclosed in Figures 5 and 6, I have shown the switch unit applied in connection with a room thermostat. In this embodiment, the housing is supported upon the wall 80 by means of a plurality of mounting screws 81 which extend through a flange formed in the outer end of the housing 82. The housing 82 is provided with an extending cylindrical portion 83 having an insulating bushing 84 supported thereby, the bushing serving as a sleeve for permitting entrance of the conducting cables 85 which lead to the terminal bushings 86 carried by the socket 87, which socket may be of the same form as the socket 27 described in connection with Figure 2.

The housing 82 is also provided with a cylindrical insulating washer 88, which extends about the inner surface thereof, and which, together with the insulating washer 89, serves to insulate the interior of the housing from the heat to which the thermally sensitive member is exposed.

Figure 2:
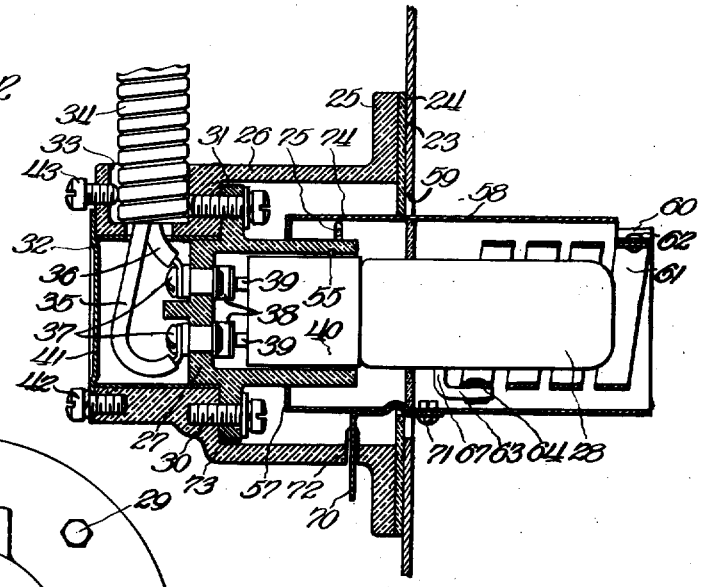
Figure 2 is a sectional elevational view of a switch unit mounted in position for use in connection with a thermostat or other type of control device.
Figure 3:
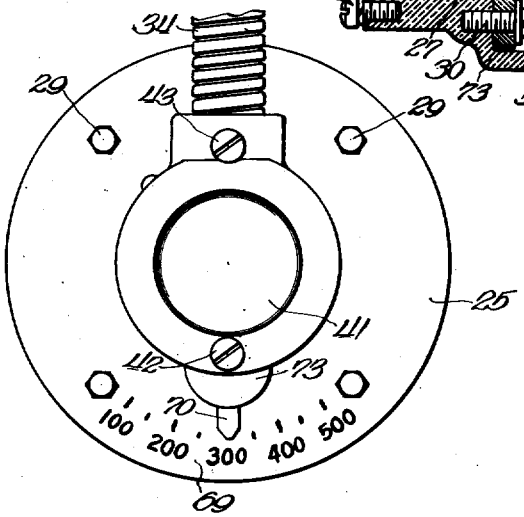
Figure 3 is an end elevation of the device shown in Figure 2.

The socket 87 is adapted to receive switch unit 28, which is secured therein as described in connection with Figure 2, and connection is effected between the switch unit 28 and the terminal bushings 86 of the conductors 85 in the manner previously described.

Extending over the outer flange of the housing 82 is a thermostat hood 90, which is secured to the housing by means of a plurality of mounting bolts 91, which thread into the flange of the housing and into the supporting wall 80. The hood 90 is adapted to receive the thermostat support 92, which is in the form of a cylindrical member having a depressed portion 93 for supporting one end of the thermally sensitive member 94 by means of the rivet 95. The support 92 is provided, at its outer end, with inturned edges 96, to which are riveted a dial member 98, the rivets 99 extending between the dial member and the inturned edges 96 of the support 92. The central portion of the dial member 98 is provided with a plurality of openings 100 for permitting the entry of air to the thermally sensitive member 94 which surrounds the switch unit 28.

The dial member 98 is also provided with a dial surface 101, which, as shown in detail in Figure 6, is provided with suitable temperature marking for positioning the dial member in any predetermined position for establishing a preselected temperature within the enclosure in which the temperature is being controlled by the thermostat. A pointer 102 is formed on a portion of the hood 90, and serves as a reference for the dial 101. A slot 103 is formed in the thermally sensitive support 92, and is adapted to receive a pin member 104 carried by the hood 98 for aligning the support 92 with respect to the hood upon rotation of the dial 98.

The free end of the thermally sensitive member 94 is provided with a permanent magnet 105, corresponding to the permanent magnet 63 shown in Figure 7. The temperature of the air within the enclosure controlled by the thermostat is sensed, through the openings 100 in the dial member 98, by the thermally sensitive member 94, and the response of this member serves to actuate the magnet 105 for causing opening or closing of the circuit controlled by the switch unit 28. The device functions in the same manner as described in connection with Figures 2 and 3, but the thermally sensitive member is of greater sensitivity, since the range of temperature employed is considerably less than that disclosed in connection with the temperature limiting control shown in Figures 2 and 3.

It is apparent that I have provided a switch of the magnetic type, which is small, compact, and easily mounted and dismounted from operative position, without the interchanging of connections or the like, which switch does not require adjustment when placed in position. Further, I have provided a switch of the type in which a snap action occurs upon opening and closing of the switch contact, which reduces the tendency for arcing at this point. Also, the switch of the present invention, when embodied in a thermostat or similar controlling device, is operative at any desired or predetermined temperature, and may be employed with devices for controlling humidity, pressure, time controls or other similar controlling devices. Also, because of the contact operating in a vacuum or inert gas filled enclosure, relatively high voltages can be carried by the switch without impairing its operation or increasing its resistance due to arcing and burning of the switch contact points.

I do not intend to be limited to the exact details shown and described in connection with the accompanying illustrated embodiment of my invention, since various modifications and structural changes may be made therein without departing from the spirit and scope of the invention, and therefore the invention is to be limited only as defined by the spirit and scope of the appended claims.

I claim:

1. In a control device, a housing, a socket mounted within said housing, a switch unit mounted in said socket comprising switch contacts disposed within an evacuated casing, thermally sensitive means encircling said casing for closing said switch contacts, and means for rotating said thermally sensitive means.

2. In a control device, a housing, a socket mounted within said housing and spaced therefrom by a heat insulating member, a switch unit mounted in said socket and comprising switch contacts disposed in an evacuated casing, magnetically responsive means for closing said contacts, and thermally sensitive means encircling said casing for actuating said magnetically responsive means.

3. In a control device, a housing, a socket mounted within said housing and spaced therefrom by a heat insulating member, a switch unit mounted in said socket and comprising switch contacts disposed in an evacuated casing, magnetically responsive means for closing said contacts, thermally sensitive means encircling said casing for actuating said magnetically responsive means, and means for rotating said thermally sensitive means about said unit.

4. In a control device, a housing, a socket mounted within said housing, a switch unit mounted in said housing and comprising switch contacts disposed in an evacuated casing, magnetically responsive means for closing said contacts, thermally sensitive means encircling said casing for actuating said magnetically responsive means, and means including a dial and a reference pointer for causing said thermally sensitive means to actuate said magnetically responsive means at any predetermined temperature.

5. In a control device, a housing, a socket mounted within said housing, conductors connected to said socket, a switch unit mounted in said socket comprising switch contacts mounted within said unit, magnetically responsive means adapted to cause said contacts to close an electrical circuit through said conductors, and thermally sensitive means having magnetized means carried thereby and rotatable upon changes of temperature to actuate said magnetically responsive means.

6. In a control device, a housing, a socket mounted within said housing, conductors connected to said socket, a switch unit mounted in said socket comprising switch contacts mounted within said unit, magnetically responsive means adapted to cause said contacts to close an electrical circuit through said conductors carried by said contacts, thermally sensitive means having a magnet carried at the free end thereof and movable upon changes of temperature for actuating said magnetically responsive means, and heat insulating members disposed between said socket and said housing and between said thermally sensitive means and said housing.

7. In a control device, a housing, a socket carried by said housing, terminal bushings in said socket, conductors extending into said housing and connected to said bushings, a switch unit mounted in said socket and comprising contacts and magnetically responsive means carried by said contacts, thermally sensitive means encircling said unit, and a magnet carried by said thermally sensitive means and adapted to attract said magnetically responsive means to close said contacts upon actuation of said thermally sensitive means due to temperature changes.

8. In a control device, a housing, a socket carried by said housing, terminal bushings in said socket, conductors extending into said housing and connected to said bushings, a switch unit mounted in said socket and comprising contacts and magnetically responsive means for adjacent said contacts, thermally sensitive means encircling said unit, a magnet carried by said thermally sensitive means for attracting said magnetically responsive means upon movement of said thermally sensitive means, and a support providing for rotation of said thermally sensitive means within said housing.

9. In a control device, a housing, a socket mounted within said housing, terminal contacts in said socket, conductors connected to said contacts, a switch unit mounted in said socket comprising a base, terminal studs carried by said base to engage said terminal contacts, a casing carried by said base, switch contacts mounted in said casing and normally spaced apart, magnetically responsive means for closing said contacts, and thermally sensitive means encircling said casing for actuating said magnetically responsive means.

10. In combination, a non-magnetic casing, terminal leads extending into said casing, a fixed contact on one of said leads, a movable contact spaced from said fixed contact and carried by the other of said leads, an armature resiliently supported on said movable contact lead, and thermally responsive magnetic means movable into position for attracting said armature to cause engagement of said contacts.

11. In a device of the class described, in combination, a non-magnetic sealed switch tube, a terminal extension disposed in said tube and having contact means at its free end, a second terminal extension having a contact in juxtaposition to said contact means and movable into position closing an electric circuit through said contact means and into another position opening said circuit, said second terminal extension having a yielding portion for moving the movable contact to one of said positions with a snap action and normally maintaining the movable contact in said position, an armature carried by the yielding portion of said second terminal extension, a relatively thin bi-metallic element disposed externally of said tube and responsive to temperature changes, said bi-metallic element having a free end in juxtaposition to the switch tube, and a relatively small permanent magnet carried by the free end of said bi-metallic element for movement into and out of position to attract said armature as said bi-metallic element is actuated by temperature changes, the movable contact being actuated to one of its positions with a snap action upon movement of the relatively small permanent magnet to position at which the magnetic attraction exerted upon said armature is in excess of the tension in the yielding portion of said terminal extension and actuated to the other position with a snap action upon movement of the relatively small permanent magnet to position at which the tension in the yielding portion of said terminal extension is in excess of the magnetic attraction exerted upon said armature.

12. In combination, an evacuated casing, sealed terminal leads extending into said casing, contacts at the ends of said leads, yielding means on one of said leads normally spacing said contacts apart, magnetically responsive means on said yielding means, and means for attracting said magnetically responsive means to close said contacts upon variations in temperature adjacent to said casing.

13. In combination, an evacuted casing, sealed terminal leads extending into said casing, contacts at the ends of said leads, yielding means on one of said leads normally spacing said contacts apart, magnetically responsive means on said yielding means, and thermally responsive means disposed exterior of said casing for attracting said magnetically responsive means to close said contacts.

14. In a device of the class described, a switch unit comprising a base, terminal studs in said base, a sealed casing secured to said base, terminal leads extending from said studs into said casing, contacts carried by said leads, yielding means supporting one of said contacts for normally spacing said contacts apart, magnetically responsive means carried by said yielding means, and thermally responsive means exterior of said casing for attracting said magnetically responsive means to close said contacts.

15. In a device of the class described, a switch unit comprising a base, terminal studs in said base, a sealed casing secured to said base, terminal leads for said studs extending into said casing, one of said leads terminating adjacent the side wall of said casing, the other of said leads extending the length of said casing and being doubled back to a point adjacent said first lead, contacts carried at the end of said leads, yielding means supporting one of said contacts for normally spacing said contacts apart, magnetically responsive means carried by said yielding means and disposed anterior to one of said contacts adjacent the side wall of said casing, and pin means carried by said base for aligning said unit in operating position.

16. In a control device a housing, a socket mounted in said housing, a switch unit mounted in said socket comprising switch contacts disposed within an evacuated casing and magnetically responsive means for closing said contacts, means for aligning said unit in said socket, thermally sensitive means encircling said casing, means carried by said thermally sensitive means for actuating said magnetically responsive means when a predetermined temperature has been reached, a rotatable support for said thermally sensitive means, means for aligning said support with respect to said housing, a dial member carried at one end of said support, said chamber having openings providing for admission of air to said thermally sensitive means, terminal bushings in said socket engaged by said switch unit, and conductors extending into said housing and connected to said bushings.

17. In a device of the class described, in combination a non-magnetic sealed switch tube, a terminal extension disposed in said tube and having contact means at its free end, a second terminal extension having a contact in juxtaposition to said contact means and movable into position closing an electric circuit through said contact means and into another position opening said circuit, said second terminal extension having a yielding portion for moving the movable contact to one of said positions with a snap action and normally maintaining the movable contact in said position, an armature carried by the yielding portion of said second terminal extension, a relatively thin bi-metallic element disposed externally of said tube and responsive to temperature changes, said bi-metallic element having a free end in juxtaposition to the switch tube, a relatively small permanent magnet carried by the free end of said bi-metallic element for movement into and out of position to attract said armature as said bi-metallic element is actuated by temperature changes, the movable contact being actuated to one of its positions with a snap action upon movement of the relatively small permanent magnet to position at which the magnetic attraction exerted upon said armature is in excess of the tension in the yielding portion of said terminal extension and actuated to the other position with a snap action upon movement of the relatively small permanent magnet to position at which the tension in the yielding portion of said terminal extension is in excess of the magnetic attraction exerted upon said armature, and means for adjusting the normal position of the free end of the bi-metallic element and thereby the normal position of the relatively small permanent magnet to adjust the temperatures at which the movable contact is actuated to closed and open circuit positions.

18. In a device of the class described, in combination, a non-magnetic sealed switch tube, a housing having a cooperating part for supporting said switch tube, a terminal extension disposed in said tube and having contact means at its free end, a second terminal extension having a contact in juxtaposition to said contact means and movable into position closing an electric circuit through said contact means and into another position opening said circuit, said second terminal extension carrying an armature disposed in said tube and having a yielding portion for moving the movable contact to one of said positions with a snap action and normally maintaining the movable contact in said position, a relatively thin bi-metallic element disposed externally of said tube and responsive to temperature changes, said bi-metallic element having a free end in juxtaposition to the switch tube, a relatively small permanent magnet carried by the free end of said bi-metallic element for movement into and out of position to attract said armature as said bi-metallic element is actuated by temperature changes, the movable contact being actuated to one of its positions with a snap action upon movement of the relatively small permanent magnet to position at which the magnetic attraction exerted upon said armature is in excess of the tension in the yielding portion of said terminal extension and actuated to the other position with a snap action upon movement of the relatively small permanent magnet to position at which the tension in the yielding portion of said terminal extension is in excess of the magnetic attraction exerted upon said armature, and means cooperating with the opposite end of said bi-metallic element and projecting from said housing for adjusting the normal position of the free end of the bi-metallic element and thereby the normal position of the relatively small permanent magnet to adjust the temperatures at which the movable contact is actuated to closed and open circuit positions.

19. The combination with a control device including an outer housing, a socket supported in said housing, circuit connections leading from said socket out of said housing, an inner housing rotatable in said outer housing and having thermally sensitive means carried thereby, and magnet means disposed at one end of said thermally sensitive means, of a replaceable switch unit having a base portion engaging in said socket, terminal studs adapted to engage said circuit connections, a sealed casing carried by said base portion, and normally disengaged contacts disposed in said casing and connected to said studs, one of said contacts having a magnetically responsive armature carried thereby.

20. In a device of the class described, in combination, a switch unit comprising a base, terminal means on said base, a non-magnetic sealed switch tube mounted on said base, a pair of terminal leads extending from said terminal means to said switch tube, fixed contact means connected in circuit with one of said leads and disposed in said tube, a contact disposed in said tube for movement into position closing an electric circuit through said fixed contact means and into position opening said circuit, said last mentioned contact being connected in circuit with the other terminal lead, yielding means disposed in said tube for moving the movable contact to one of said positions and normally maintaining the movable contact in said position, an armature carried by said yielding means and disposed within the switch tube, a relatively thin bi-metallic element disposed externally of said tube and responsive to temperature changes, and a relatively small permanent magnet carried by said bi-metallic element for movement into and out of position to attract said armature as said bi-metallic element is actuated by temperature changes, the movable contact being actuated to one of its positions with a snap action upon movement of the relatively small permanent magnet to position at which the magnetic attraction exerted upon said armature is in excess of the tension in said yielding means and actuated to the other position with a snap action upon movement of the relatively small permanent magnet to position at which the tension in said yielding means is in excess of the magnetic attraction exerted upon said armature.

21. The combination with a temperature controlling device having a thermostatic element rotatable into a plurality of temperature selecting positions and having a magnet secured to the free end thereof, of a replaceable switch unit including an evacuated casing having a pair of normally disengaged switch contacts, one of said contacts having magnetically responsive means thereon, movement of said thermally sensitive element due to temperature changes causing said magnet to move adjacent said magnetically responsive means for actuating said means to close said contacts.

22. In a magnetic switch of the class described, actuating means comprising a thermally sensitive element coiled about said switch and responsive to temperature changes, and a magnet carried at one end of said element and adapted to be moved into a position adjacent said switch to actuate said switch upon movement of said thermally sensitive element due to variations in temperature.

23. In a magnetic switch of the class described, a housing, a second housing rotatable therein, a thermostatic element carried within said second housing and having a magnet at one end thereof, a switch unit supported in said first housing and having a projecting casing surrounded by said thermostatic element, contacts in said casing, magnetically responsive means carried by one of said contacts, said thermostatic element moving said magnet into proximity to said magnetically responsive means upon a variation in temperature, and means for rotating said second housing to select the temperature at which it is desired to engage said contacts.

24. In a device of the class described, in combination, a non-magnetic sealed switch tube, sealed terminal leads extending into said tube, contacts disposed within said tube and connected in circuit with said leads, one of said contacts having movement for closing and opening an electric circuit through said contacts, yielding means on one of said leads for normally maintaining the movable contact in one of said positions, an armature carried by said yielding means and disposed within the switch tube, a relatively thin bi-metallic element disposed externally of said tube and responsive to temperature changes, and a relatively small permanent magnet carried by said bi-metallic element for movement into and out of position to attract said armature and actuate the movable contact to its other position against the tension of said yielding means.

OSCAR J. LEINS.